US012620682B2

(12) United States Patent
Park

(10) Patent No.: US 12,620,682 B2
(45) Date of Patent: May 5, 2026

(54) JELLY-ROLL ELECTRODE ASSEMBLY AND SECONDARY BATTERY COMPRISING THE SAME

(71) Applicant: LG ENERGY SOLUTION, LTD., Seoul (KR)

(72) Inventor: Inbok Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 512 days.

(21) Appl. No.: 18/278,770

(22) PCT Filed: Nov. 24, 2022

(86) PCT No.: PCT/KR2022/018729
§ 371 (c)(1),
(2) Date: Aug. 24, 2023

(87) PCT Pub. No.: WO2023/096376
PCT Pub. Date: Jun. 1, 2023

(65) Prior Publication Data
US 2024/0136683 A1      Apr. 25, 2024
US 2024/0234990 A9      Jul. 11, 2024

(30) Foreign Application Priority Data

Nov. 24, 2021    (KR) ......................... 10-2021-0163387
Nov. 23, 2022    (KR) ......................... 10-2022-0158763

(51) Int. Cl.
*H01M 50/477*      (2021.01)
*H01M 10/04*       (2006.01)
*H01M 50/595*      (2021.01)

(52) U.S. Cl.
CPC ..... *H01M 50/595* (2021.01); *H01M 10/0431* (2013.01); *H01M 50/477* (2021.01)

(58) Field of Classification Search
CPC ......... H01M 10/0431; H01M 10/0587; H01M 50/474; H01M 50/477; H01M 50/486; H01M 50/595
See application file for complete search history.

(56) References Cited

U.S. PATENT DOCUMENTS

2007/0154787 A1      7/2007   Jang et al.
2010/0255357 A1      10/2010  Baek et al.
(Continued)

FOREIGN PATENT DOCUMENTS

EP      2 171 790 B1      4/2017
EP      4 386 918 A1      6/2024
(Continued)

OTHER PUBLICATIONS

International Search Report (PCT/ISA/210) issued in PCT/KR2022/018729, dated Mar. 6, 2023.
(Continued)

*Primary Examiner* — Kevin E Yoon
(74) *Attorney, Agent, or Firm* — Birch, Stewart, Kolasch & Birch, LLP

(57) ABSTRACT

A jelly-roll electrode assembly includes a cathode sheet, an anode sheet, and a separator interposed between the cathode sheet and the anode sheet, the cathode sheet, the anode sheet, and the separator being wound together. An outermost side of the jelly-roll electrode assembly includes a non-coated portion on which no active material layer is provided on the anode sheet. A swelling tape is located on an inner surface of the non-coated portion of the anode sheet facing toward a central part of the jelly-roll electrode assembly. One or more embossments or wrinkles are provided in the swelling tape.

17 Claims, 3 Drawing Sheets

(56)            References Cited

U.S. PATENT DOCUMENTS

| | | |
|---|---|---|
| 2012/0288749 A1 | 11/2012 | Kim |
| 2014/0106207 A1 | 4/2014 | Kim et al. |
| 2020/0044276 A1 | 2/2020 | Sakai et al. |
| 2021/0249698 A1 | 8/2021 | Mizawa et al. |
| 2022/0200059 A1 | 6/2022 | Jeong et al. |

FOREIGN PATENT DOCUMENTS

| | | | | |
|---|---|---|---|---|
| JP | 2001273933 | A | * | 10/2001 |
| JP | 2014-516373 | A | | 7/2014 |
| JP | 6928918 | B2 | | 9/2021 |
| KR | 10-0719725 | B1 | | 5/2007 |
| KR | 10-2009-0008060 | A | | 1/2009 |
| KR | 10-2009-0088761 | A | | 8/2009 |
| KR | 10-1163387 | B1 | | 7/2012 |
| KR | 10-1182892 | B1 | | 9/2012 |
| KR | 10-2014-0065592 | A | | 5/2014 |
| KR | 10-2015-0071250 | A | | 6/2015 |
| KR | 10-2018-0008037 | A | | 1/2018 |
| KR | 10-1873472 | B1 | | 7/2018 |
| KR | 10-2021-0004102 | A | | 1/2021 |
| WO | WO 2018/142928 | A1 | | 8/2018 |
| WO | WO 2019/244817 | A1 | | 12/2019 |
| WO | WO 2020/235904 | A1 | | 11/2020 |

OTHER PUBLICATIONS

Extended European Search Report for European Application No.
22899058.6, dated May 12, 2025.

* cited by examiner

【FIG. 1】
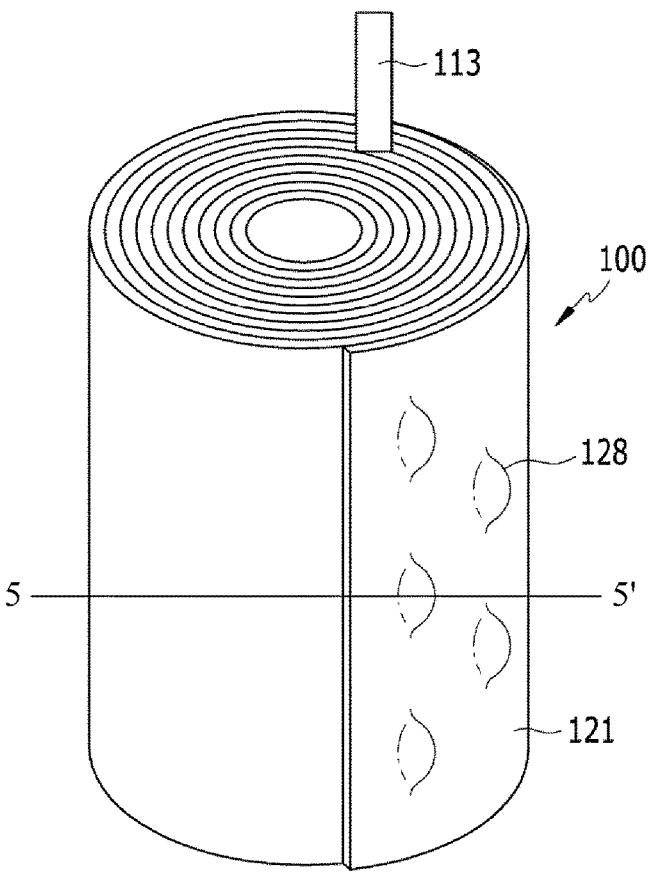
【FIG. 2】
120
123
126   125   126   124   126
A
A'
126   126   126
122          121

【FIG. 3】
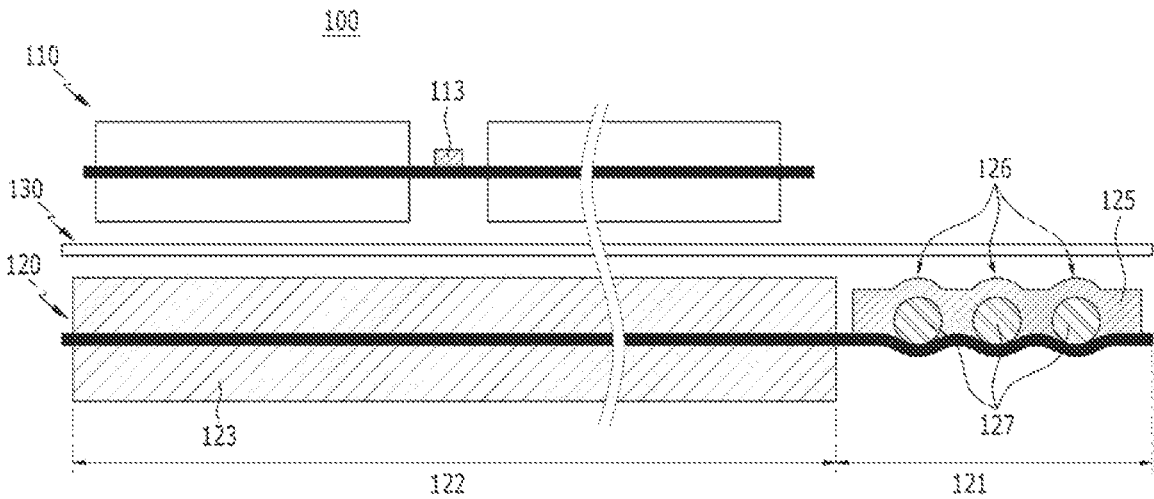
【FIG. 4】
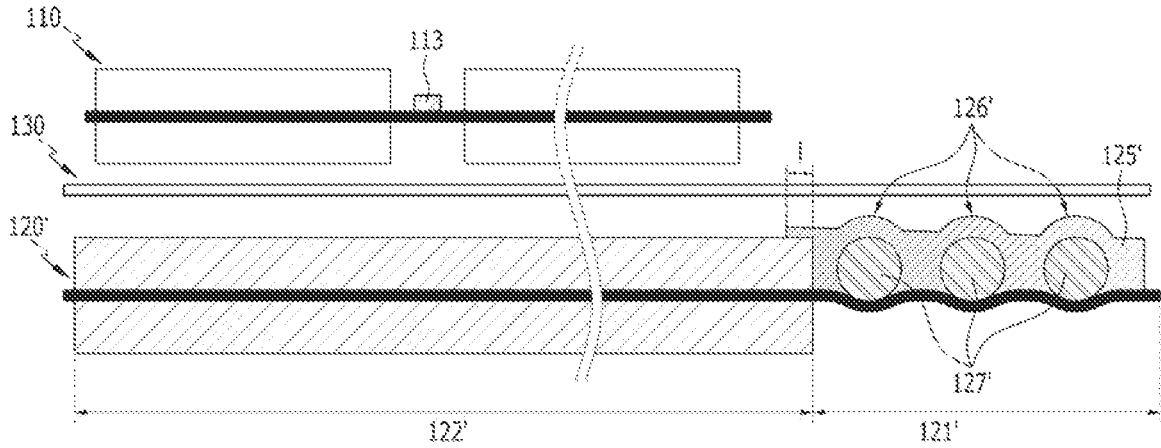

[FIG. 5]
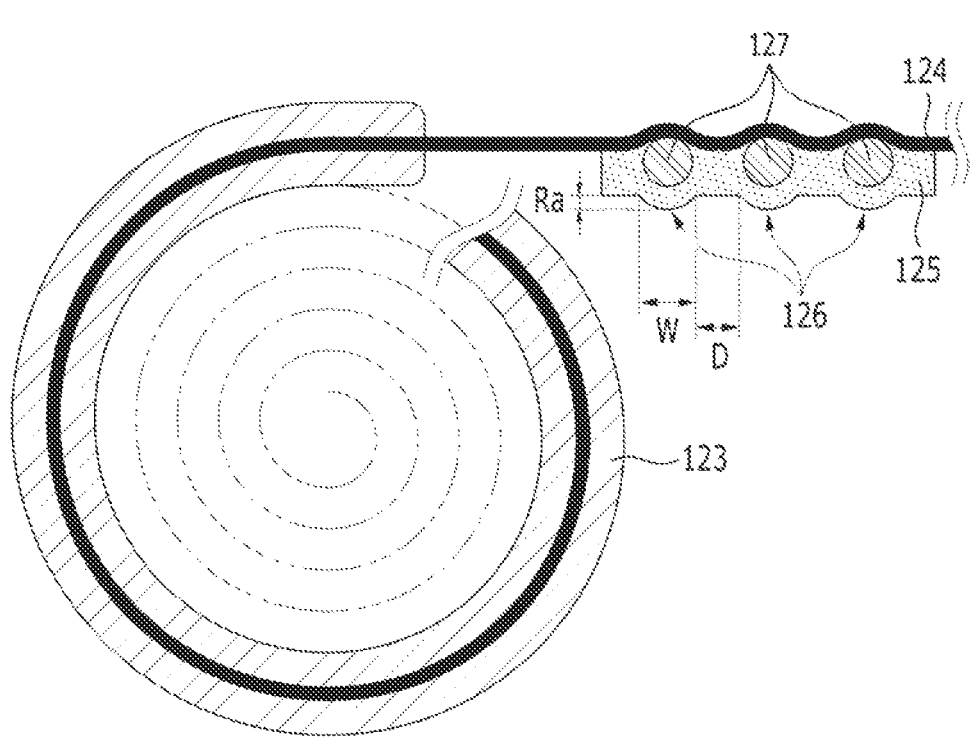

1

JELLY-ROLL ELECTRODE ASSEMBLY AND SECONDARY BATTERY COMPRISING THE SAME

TECHNICAL FIELD

Cross Citation with Related Application(s)

This application claims the benefit of Korean Patent Application No. 10-2021-0163387 filed on Nov. 24, 2021 and Korean Patent Application No. 10-2022-0158763 filed on Nov. 23, 2022 in the Korean Intellectual Property Office, the entire contents of which are incorporated herein by reference.

The present disclosure relates to a jelly-roll electrode assembly and a secondary battery comprising the same.

BACKGROUND

With the technology development and increased demand for mobile devices, demand for secondary batteries as energy sources have been rapidly increasing. In particular, a secondary battery has attracted considerable attention as an energy source for power-driven devices, such as an electric bicycle, an electric vehicle, and a hybrid electric vehicle, as well as an energy source for mobile devices, such as a mobile phone, a digital camera, a laptop computer and a wearable device.

Based on the shape of the battery case, a secondary battery is classified into a cylindrical battery where an electrode assembly is mounted in a cylindrical metal can, a prismatic battery where an electrode assembly is mounted in a prismatic metal can, and a pouch-type battery where an electrode assembly is mounted in a pouch type case made of an aluminum laminate sheet. Among them, the cylindrical battery has an advantage that it has a relatively large capacity and is structurally stable.

The electrode assembly mounted in the battery case is an electricity-generating device, having a cathode/separator/anode laminate structure, which can be charged and discharged. The electrode assembly is classified into a jelly-roll type, a stacked type, and a stack/folding type. The jelly-roll type is a shape in which a cathode and an anode, each made of an active material-coated long sheet, is wound with a separator interposed between them, the stacked type is a shape in which a plurality of cathodes and a plurality of anodes each having a predetermined size are sequentially stacked in a state where a separator is interposed therebetween, and a stack/folding type is a combination of a jelly-roll type and a stack type. Of these, the jelly-roll-type electrode assembly has advantages that manufacture is easy and the energy density per weight is high.

Therefore, in recent years, as the need for batteries to achieve high capacity and high output has increased, in the case of a cylindrical battery, optimization is underway by changing the thickness of current collectors or separators, and the size or shape of cans, top caps and the like in order to put a large quantity of electrodes in a limited space.

As one of the methods thereof, a method of utilizing copper as an outer tab as an anode current collector has been proposed. That is, the tab and separator on the outside are removed, and the copper current collector physically abuts on the cylindrical can so that the current flows out.

Through this method, the input amount of the separator and the input amount of the tab can be reduced, and the outer diameter can be slightly reduced to exhibit the effects of securing space and reducing costs, and the secured space can be utilized to increase capacity or improve output. In addition, since the copper current collector directly abuts on the can, the area of transferring heat is increased, and thus, the heat generation level can be improved.

However, when copper is actually exposed on the outer shell portion, one or two points having a larger outer diameter abut on the can in accordance with the circularity of the jelly roll, which reduces the effect than previously expected.

In order to improve this, the contact level was improved by using a swelling tape that has the property of swelling up when reacting with the electrolyte, but when attaching in the manufacturing process, an air trap is generated, which causes a problem that the outer diameter increases and thus the productivity decreases.

Therefore, it is necessary to develop a jelly-roll electrode assembly and secondary battery technology that can solve these problems.

DETAILED DESCRIPTION OF THE INVENTION

Technical Problem

It is an object of the present disclosure to provide a jelly-roll electrode assembly that can uniformly control an air trap generated by the attachment of the swelling tape, thereby improving the contact level with a battery case of the outermost side anode non-coated portion while solving the problem of the outer diameter increase due to the air trap, and a secondary battery comprising the same.

The objects of the present disclosure are not limited to the aforementioned objects, and other objects which are not mentioned herein should be clearly understood by those skilled in the art from the following detailed description and the accompanying drawings.

Technical Solution

According to one embodiment of the present disclosure, there is provided a jelly-roll electrode assembly comprising a cathode sheet, an anode sheet, and a separator interposed between the cathode sheet and the anode sheet, the cathode sheet, the anode sheet, and the separator being wound together, wherein an outermost side of the jelly-roll electrode assembly includes a non-coated portion on which no active material layer is provided on the anode sheet, wherein a swelling tape is located on an inner surface of the non-coated portion of the anode sheet facing towards a central part of the jelly-roll electrode assembly, and wherein one or more embossments or wrinkles are provided in the swelling tape.

The anode sheet may include a coated portion having an active material layer provided on the anode sheet, and the swelling tape may be attached to a part of the inner surface of the non-coated portion of the anode sheet and a part of the coated portion of the anode sheet at a boundary surface between the non-coated portion and the coated portion of the anode sheet.

Alternatively, the swelling tape may be attached to only a part of the inner surface of the non-coated portion of the anode sheet.

Further, the swelling tape may cover 10% to 90% of a total area of the inner surface of the non-coated portion of the anode sheet.

Moreover, the anode sheet may include a coated portion having an active material layer provided on the anode sheet, and the non-coated portion of the anode sheet on which the swelling tape is located may face the coated portion of the anode sheet when wound.

Meanwhile, the non-coated portion of the anode sheet contacted by the swelling tape may have one or more embossments or wrinkles corresponding to the swelling tape.

The one or more embossments or wrinkles of the non-coated portion of the anode sheet may be formed by the one or more embossments or wrinkles of the swelling tape.

Air may be trapped in the one or more embossments or wrinkles of the swelling tape.

Here, the air may be trapped between the swelling tape and the non-coated portion of the anode sheet.

The one or more embossments may have regular patterns. Specifically, a roughness (Ra) of each of the one or more embossments may be 0.1 mm to 20 mm, and a size of each of the one or more embossments may be 10 $\mu$m to 5 mm. When the one or more embossments include two or more embossments, a distance between adjacent embossments may be 50 $\mu$m to 5 mm.

Meanwhile, the one or more wrinkles may have irregular shapes.

According to another embodiment of the present disclosure, there is provided a method for manufacturing the jelly-roll electrode assembly, the method comprising:

an electrode assembly manufacturing step of winding the cathode sheet, the anode sheet, and the separator interposed between the cathode sheet and the anode sheet such that the non-coated portion of the anode sheet is on the outermost side of the jelly-roll electrode assembly; and a tape attachment step of attaching to inner surface of the non-coated portion of the anode sheet the swelling tape having the one or more embossments or attaching the swelling tape to the inner surface of the non-coated portion of the anode sheet so as to form the one or more wrinkles.

At this time, attaching the swelling tape so as to form the one or more wrinkles may include attaching a part of the swelling tape in an unattached form when attaching the swelling tape, applying vibration to an attachment portion of the swelling tape to induce micro-bubbles or micro-wrinkles, or making a central part of a suction pad for attaching the swelling tape into a detachment state to form a vacuum space, thereby inducing generation of bubbles during attachment.

Alternatively, according to yet another embodiment of the present disclosure, there is provided a method for manufacturing the jelly-roll electrode assembly, the method comprising:

a tape attachment step of attaching the swelling tape having the one or more embossments onto the non-coated portion of one end of the anode sheet, or attaching the swelling tape so as to form the one or more wrinkles; and an electrode assembly manufacturing step of winding the cathode sheet, the anode sheet, and the separator interposed between the cathode sheet and the anode sheet such that the inner surface faces toward the central part of the jelly-roll electrode assembly is at the outermost side of the jelly-roll electrode assembly.

At this time, attaching the swelling tape so as to form the one or more wrinkles includes attaching a part of the swelling tape in an unattached form when attaching the swelling tape, applying vibration to an attachment portion of the swelling tape to induce micro-bubbles or micro-wrinkles, or making a central part of a suction pad for attaching the swelling tape into a detachment state to form a vacuum space, thereby inducing the generation of bubbles during attachment.

On the other hand, according to a further embodiment of the present disclosure, there is provided a secondary battery comprising the jelly-roll electrode assembly.

BRIEF DESCRIPTION OF THE DRAWINGS

FIG. 1 is a perspective view of a jelly-roll electrode assembly according to one embodiment of the present disclosure;

FIG. 2 is a plan view of an anode sheet of a jelly-roll electrode assembly according to one embodiment of the present disclosure;

FIG. 3 is a cross-sectional view of a jelly-roll electrode assembly according to one embodiment of the present disclosure before winding;

FIG. 4 is a cross-sectional view of a jelly-roll electrode assembly according to another embodiment of the present disclosure before winding; and FIG. 5 is a cross-sectional view taken along 5-5″ of FIG. 1.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of a part and an area are exaggerated.

Further, throughout the description, when a portion is referred to as "including" or "comprising" a certain component, it means that the portion can further include other components, without excluding the other components, unless otherwise stated.

Further, throughout the description, when it is referred to as "planar", it means when a target portion is viewed from the upper side, and when it is referred to as "cross-sectional", it means when a target portion is viewed from the side of a cross section cut vertically.

FIG. 1 is a perspective view of a jelly-roll electrode assembly according to one embodiment of the present disclosure.

Referring to FIG. 1, the jelly-roll electrode assembly 100 according to one embodiment of the present disclosure may have a shape in which a cathode sheet, an anode sheet, and a separator interposed between the cathode sheet and the anode sheet are wound together.

At this time, the cathode tab 113 may be formed on the cathode sheet, which may then be electrically connected to the cap assembly or the like of the cylindrical battery to form a cathode terminal.

Meanwhile, the outermost side of the jelly-roll electrode assembly 100 is wound with a non-coated portion 121 on which no active material layer is formed on the anode sheet, and this non-coated portion 121 then comes into contact with the inner wall surface of the can of the secondary battery. Therefore, the non-coated portion 121 of the anode sheet functions as a terminal and can be electrically and directly connected to the can, which is a cylindrical secondary battery case, and thus, may not require a separate anode tab.

In addition, since the jelly-roll electrode assembly 100 may not be formed with a separator on its outermost side, it is possible to achieve the effect of reducing the outer diameter, thereby securing the internal space of the battery, increasing the capacity, improving the energy density, and improving the battery performance and effect.

However, as described above, when the non-coated portion 121 of the anode sheet is actually exposed to the outer shell portion, there is a problem that one or two points having a larger outer diameter abut on the can in accordance with the circularity of the jelly roll, which reduces the effect than previously expected. Therefore, in the present disclosure, in order to improve this problem, a swelling tape having the property of swelling up when reacting with the electrolyte is applied.

At this time, the swelling tape has a structure attached to the inner surface toward the central part of the jelly-roll electrode assembly 100, rather than the outer shell of the non-coated portion 121 of the anode sheet of the jelly-roll electrode assembly 100, so that the non-coated portion 121 of the outermost side anode sheet can then contact the cylindrical secondary battery case as a whole, without affecting the capacity.

Therefore, such a swelling tape is not shown in FIG. 1.

Meanwhile, in order to specifically describe the swelling tape according to the present disclosure, FIG. 2 illustrates a plan view of the anode sheet 120 before winding in the jelly-roll electrode assembly 100 of FIG. 1, FIG. 3 illustrates a cross-sectional view of the jelly-roll electrode assembly 100 of FIG. 1 before winding, FIG. 4 illustrates a cross-sectional view of a jelly-roll electrode assembly 100 before winding according to another embodiment, and FIG. 5 illustrates a cross-sectional view taken along 5-5' of the jelly roll electrode assembly 100 of FIG. 1.

First, referring to FIGS. 2 and 3, the cathode sheet 110 includes a coated portion on which a cathode active material layer is formed and a non-coated portion on which no cathode active material layer is formed, and has a structure in which the non-coated portion is provided between the coated portions and the cathode tab 113 is attached to the non-coated portion.

Further, a separator 130 is interposed between the cathode sheet 110 and the anode sheet 120.

The anode sheet 120 includes a coated portion 122 in which an active material layer 123 is formed on the anode current collector 124, and a non-coated portion 121 on which no active material layer 123 is formed, wherein the non-coated portion 121 is located on one side and is wound around the outermost side, thereby serving as an anode terminal.

Meanwhile, a swelling tape 125 is attached to the winding inner surface of the non-coated portion 121.

Here, the swelling tape 125 may be formed as an area (A') covering 10% to 90% of the total area (A) of the inner surface of the non-coated portion 121 of the anode sheet 120.

Further, the swelling tape 125 may be formed only on a part of the inner surface of the non-coated portion 121 so as not to overlap with the coated portion 122 of the anode sheet 120.

Alternatively, referring to FIG. 4, the swelling tape 125' may be attached to a part of the inner surface of the non-coated portion 121' of the anode sheet 120', and a part of the coated portion 122' of the anode sheet 120 in the direction of the coated portion 122' of the anode sheet 120' at the boundary surface between the non-coated portion 121' and the coated portion 122' of the anode sheet. At this time, it may be formed within a length (l) range that does not overlap with the active material layer of the facing cathode sheet 110.

However, in either case, the non-coated portion 121 of the outermost side anode sheet 120 on which the swelling tape 125 is formed faces the active material layer 123 of the anode sheet 120 located on the inner side, that is, the coated portion 122.

Therefore, since the swelling tape 125 is formed on a portion where the active material layer 123 does not face the cathode, that is, a portion that does not contribute to the capacity, the problem of capacity does not occur. At the same time, since the swelling tape 125 is formed on the inner side of the current collector 124 of the anode sheet 120 at the outermost side of the jelly-roll electrode assembly 100, the current collector 124 can contact the can of the cylindrical battery case as a whole, and thus, the effect intended by the present disclosure can be achieved without diminishing the improvement in conductivity and heat generation level.

Meanwhile, the swelling tape 125 has a property of expanding its volume when it absorbs electrolyte, and may be a single-sided or double-sided tape.

At this time, the single-sided or double-sided tape may be made of at least one selected from the group consisting of polyurethane (PU), polyethylene (PE), polycarbonate (PC), polypropylene (PP), and polyimide (PI).

Alternatively, the swelling tape 125 may have a structure in which an adhesive layer is formed on one side or both sides of the fabric substrate.

Here, the fabric substrate may be a polyolefin-based substrate, for example, polyethylene (PE) or polypropylene (PP), and the adhesive layer may include one or more materials selected from the group consisting of polyacrylate (PA), rubber, and styrene.

Meanwhile, such a swelling tape 125 may be formed with one or more embossing or wrinkles 126.

The embossing or wrinkles 126 are formed so that the swelling tape 125 can trap air 127, 127' at an appropriate position, and thus, air is trapped in the embossing or wrinkles 126 of the swelling tape 125. Specifically, it is formed between the swelling tape 125 and the current collector 124.

Therefore, when attaching it by air trapped in the embossing or wrinkles 126 of the swelling tape 125, embossing or wrinkles corresponding to the swelling tape 125 may also be formed on the non-coated portion 121 of the anode sheet 120.

That is, referring to FIG. 1 again, it can be confirmed that the embossing or wrinkles 126 are transferred to the non-coated portion 121 of the anode sheet to provide embossing or wrinkles 128.

Therefore, air traps that may occur while attaching the swelling tape 125 to the non-coated portion 121 can artificially controlled, thereby preventing the atypical outer diameter increase resulting therefrom. In addition, by generating embossing or wrinkles on the surface of the non-coated portion 121 of the anode sheet, the non-coated portion 121 can then widen the contact area with the inner surface of the battery case, thereby increasing conductivity and improving resistance.

Meanwhile, the embossing or wrinkles 126 may be artificially formed.

Specifically, the embossing may be formed by a rolling roll or the like having a regular pattern so as to have a regular pattern.

At this time, the average roughness (Ra) of the center line of the embossing may be 0.1 mm to 20 mm, specifically 1 mm to 3 mm.

The roughness (Ra) of the embossing means the height of the embossing, and is the height from the flat portion to the highest point of the convex portion.

This can adjust the height when producing embossing on the swelling tape.

If the roughness is too small outside the above range, appropriate trapping of air or transfer of the irregularity shape to the non-coated portion of the anode sheet may not be sufficiently performed, and if the roughness is too large, the overall volume may increase, which is not preferable.

Further, the size (W) of the embossing may be 10 μm to 5 mm, specifically 100 μm to 2 mm.

The size means a diameter when the shape of the embossing is circular, and means the distance of the longest straight line when the shape is a polygon.

If the size of the embossing is too small outside the above range, the force to push outward is insufficient and thus, the surface adhesion effect intended by the present disclosure cannot be sufficiently observed. If the size is too large, the overall volume may increase, which is not preferred.

Further, the embossing may be formed by two or more numbers, wherein the distance D between them may be 50 μm to 5 mm, specifically 100 μm to 2 mm.

If the distance is too small outside the above range, the air inside the embossing may join together and the shape may change, and thus, the resistance distribution may change. If the distance is too large, the intended resistance reduction effect may be reduced, which is not preferable.

On the other hand, the swelling tape 125 may be formed with wrinkles having irregularity rather than embossing having regular patterns.

Here, the irregularity is not a pattern formed with a certain size, height, and distance, but intentionally formed when attaching or manufacturing the swelling tape 125, but formed without having regularity.

Nevertheless, these wrinkles can also control air trap by artificially providing a space where air can be trapped, and wrinkles can also be generated in the non-coated portion of the anode sheet by the trapped air. Thus, in this manner, it is possible to increase the contact area between the non-coated portion of the outermost side anode sheet and the battery case.

Next, a method of forming such embossing and wrinkles will be described in more detail.

According to another embodiment of the present disclosure, there is provided a method for manufacturing the jelly-roll electrode assembly, the method comprising:

an electrode assembly manufacturing step of winding a cathode sheet, an anode sheet, and a separator interposed between the cathode sheet and the anode sheet, and winding a non-coated portion of the anode sheet on the outermost side on which no active material layer is formed to manufacture a jelly-roll electrode assembly; and a tape attachment step of attaching to the non-coated portion of the anode sheet a swelling tape formed with embossing on the inner surface of the jelly-roll electrode assembly toward the central part of the anode sheet, or attaching the swelling tape so as to form wrinkles.

Alternatively, there is provided a method for manufacturing the jelly-roll electrode assembly, the method comprising:

a tape attachment step of attaching a swelling tape formed with embossing onto the non-coated portion of one end of the anode sheet, or attaching the swelling tape so as to form wrinkles; and an electrode assembly manufacturing step of winding a cathode sheet, an anode sheet, and a separator interposed between the cathode sheet and the anode sheet so that a portion to which the swelling tape is attached is located on the inner surface of the jelly-roll electrode assembly from the outermost side toward the central part of the jelly-roll electrode assembly, and winding a non-coated portion of the anode sheet on the outermost side to manufacture a jelly-roll electrode assembly.

That is, in other words, an electrode assembly is first manufactured, and then a swelling tape may be attached to the non-coated portion of the anode sheet during winding, or alternatively, before manufacturing the electrode assembly, a swelling tape is first attached to the non-coated portion of the anode sheet, and then the anode sheet and other components can be wound to manufacture the electrode assembly.

However, in either case, when forming embossing on the swelling tape, the method is not limited, but for example, embossing are formed during manufacture of a swelling tape using a roller having embossing, and the swelling tape already formed with embossing can be attached to the non-coated portion of the negative electrode sheet to manufacture the electrode assembly.

On the other hand, in the case of forming wrinkles in the swelling tape, they are formed by various methods. Specifically, attaching the swelling tape so as to form wrinkles includes attaching a part thereof in an unattached form when attaching the swelling tape, or applying vibration to the attachment portion to induce micro-bubbles or micro-wrinkles, or making the central part of a suction pad for attaching the swelling tape into a detachment state to form a vacuum space, thereby inducing generation of bubbles during attachment.

More specifically, when attaching the swelling tape, if a part thereof is attached in an unattached form and then attached to the non-coated portion of the anode sheet using a roller, wrinkles are generated in the unattached portion.

Alternatively, when vibration is applied to the attachment portion, the swelling tape is attached in a state in which air is inserted while the attaching portion vibrates, generating micro-bubbles and creating micro-wrinkles.

Alternatively, when the swelling tape is attached to the non-coated portion of the anode sheet, it is attached using a suction pad. At this time, the central part of the suction pad is made into a detachment state to form a vacuum space, thereby inducing air formation of bubbles in the central part at the time of attachment, wrinkles due to bubbles can be formed.

The embossing or wrinkles can be formed on the swelling tape by various methods, and the present disclosure is not limited to the above method, they can be formed by a simple method as described above.

On the other hand, according to the present disclosure, the air trap can be controlled by such a method, so that a contact area between the non-coated portion of the anode and the battery case can be increased by trapped air formed in the swelling tape.

The composition, structure and the like of the cathode sheet, anode sheet, and separator constituting other jelly-roll electrode assemblies are known in the art, and thus, a detailed description is omitted herein.

Meanwhile, the present disclosure provides a secondary battery including the jelly-roll electrode assembly.

At this time, the secondary battery may be a cylindrical secondary battery or a prismatic secondary battery in which the jelly-roll electrode assembly is mounted in a can.

Such a secondary battery is also known in the art, and thus, a detailed description thereof is omitted herein.

Although preferred embodiments of the present disclosure have been described in detail above with reference to the accompanying drawings, the scope of the present disclosure is not limited thereto, and various modifications and improvements can be made by those skilled in the art using the basic concepts of the present disclosure which are defined in the appended claims, which also fall within the scope of the present disclosure.

DESCRIPTION OF REFERENCE NUMERALS

100: jelly-roll electrode assembly
110: cathode sheet
120: anode sheet
130: separator
113: anode tab
121 non-coated portion of anode sheet
122: coated portion of anode sheet
125: swelling tape
126: embossing or wrinkles

INDUSTRIAL APPLICABILITY

According to embodiments, the jelly-roll electrode assembly of the present disclosure includes a swelling tape on the inner surface of the battery non-coated portion of the outermost side anode sheet, and intentionally form embossing or wrinkles on the swelling tape to uniformly control the air trap, whereby the contact area between the outermost side non-coated portion and the subsequent battery case can be increased by using this, thereby achieving the effect of securing conductivity and improving resistance.

The invention claimed is:

1. A jelly-roll electrode assembly comprising a cathode sheet, an anode sheet, and a separator interposed between the cathode sheet and the anode sheet,
   wherein the cathode sheet, the anode sheet, and the separator are wound together,
   wherein an outermost side of the jelly-roll electrode assembly includes a non-coated portion on which no active material layer is provided on the anode sheet,
   wherein a swelling tape is located on an inner surface of the non-coated portion of the anode sheet facing towards a central part of the jelly-roll electrode assembly, and wherein one or more embossments or wrinkles are provided in the swelling tape, wherein: air is trapped in the one or more embossments or wrinkles of the swelling tape.

2. The jelly-roll electrode assembly according to claim 1, wherein:
   the anode sheet includes a coated portion having an active material layer provided on the anode sheet, and
   the swelling tape is attached to a part of the inner surface of the non-coated portion of the anode sheet and a part of the coated portion of the anode sheet at a boundary surface between the non-coated portion and the coated portion of the anode sheet.

3. The jelly-roll electrode assembly according to claim 1, wherein:
   the swelling tape is attached to only a part of the inner surface of the non-coated portion of the anode sheet.

4. The jelly-roll electrode assembly according to claim 1, wherein:
   the swelling tape covers 10% to 90% of a total area of the inner surface of the non-coated portion of the anode sheet.

5. The jelly-roll electrode assembly according to claim 1, wherein:
   the anode sheet includes a coated portion having an active material layer provided on the anode sheet, and
   the non-coated portion of the anode sheet on which the swelling tape is located faces the coated portion of the anode sheet when wound.

6. The jelly-roll electrode assembly according to claim 1, wherein:
   the non-coated portion of the anode sheet contacted by the swelling tape has one or more embossments or wrinkles corresponding to the swelling tape.

7. The jelly-roll electrode assembly according to claim 6, wherein:
   the one or more embossments or wrinkles of the non-coated portion of the anode sheet are formed by the one or more embossments or wrinkles of the swelling tape.

8. The jelly-roll electrode assembly according to claim 1, wherein:
   the one or more embossments have a regular pattern.

9. The jelly-roll electrode assembly according to claim 8, wherein:
   a roughness (Ra) of each of the one or more embossments is 0.1 mm to 20 mm.

10. The jelly-roll electrode assembly according to claim 8, wherein:
   a size of each of the one or more embossments is 10 μm to 5 mm.

11. The jelly-roll electrode assembly according to claim 8, wherein:
   the one or more embossments include two or more embossments, and
   a distance between adjacent embossments is 50 μm to 5 mm.

12. The jelly-roll electrode assembly according to claim 1, wherein:
   the one or more wrinkles have irregular shapes.

13. A method for manufacturing the jelly-roll electrode assembly of claim 1, the method comprising:
   an electrode assembly manufacturing step of winding the cathode sheet, the anode sheet, and the separator interposed between the cathode sheet and the anode sheet such that the non-coated portion of the anode sheet is on the outermost side of the jelly-roll electrode assembly; and a tape attachment step of attaching to the inner surface of the non-coated portion of the anode sheet to the swelling tape having the one or more embossments or attaching the swelling tape to the inner surface of the non-coated portion of the anode sheet so as to form the one or more wrinkles.

14. The method for manufacturing the jelly-roll electrode assembly according to claim 13, wherein:

attaching the swelling tape so as to form the one or more wrinkles includes one of:

attaching a part of the swelling tape in an unattached form when attaching the swelling tape;

applying vibration to an attachment portion of the swelling tape to induce micro-bubbles or micro-wrinkles; or making a central part of a suction pad for attaching the swelling tape into a detachment state to form a vacuum space, thereby inducing generation of bubbles during attachment.

15. A method for manufacturing the jelly-roll electrode assembly of claim 1, the method comprising:

a tape attachment step of attaching the swelling tape having the one or more embossments onto the non-coated portion of one end of the anode sheet, or attaching the swelling tape so as to form the one or more wrinkles; and an electrode assembly manufacturing step of winding the cathode sheet, the anode sheet, and the separator interposed between the cathode sheet and the anode sheet such that the inner surface faces toward the central part of the jelly-roll electrode assembly and is at the outermost side of the jelly-roll electrode assembly.

16. The method for manufacturing the jelly-roll electrode assembly according to claim 15, wherein:

attaching the swelling tape so as to form the one or more wrinkles includes:

attaching a part of the swelling tape in an unattached form when attaching the swelling tape;

applying vibration to an attachment portion of the swelling tape to induce micro-bubbles or micro-wrinkles; or making a central part of a suction pad for attaching the swelling tape into a detachment state to form a vacuum space, thereby inducing the generation of bubbles during attachment.

17. A secondary battery comprising the jelly-roll electrode assembly according to claim 1.

* * * * *